No. 789,007. Patented May 2, 1905.

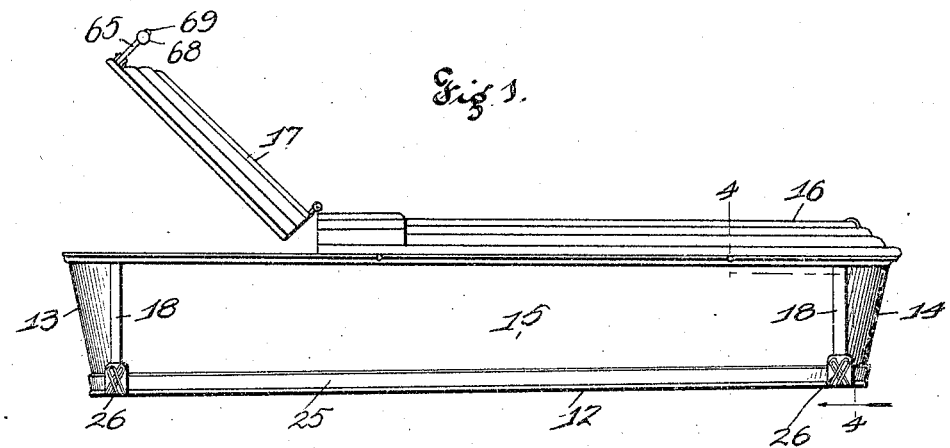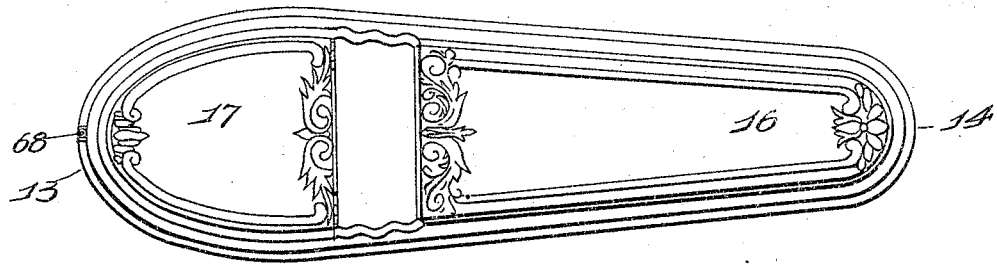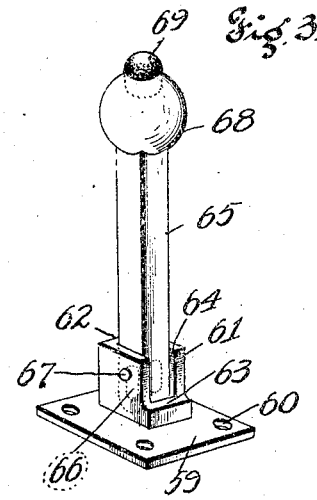

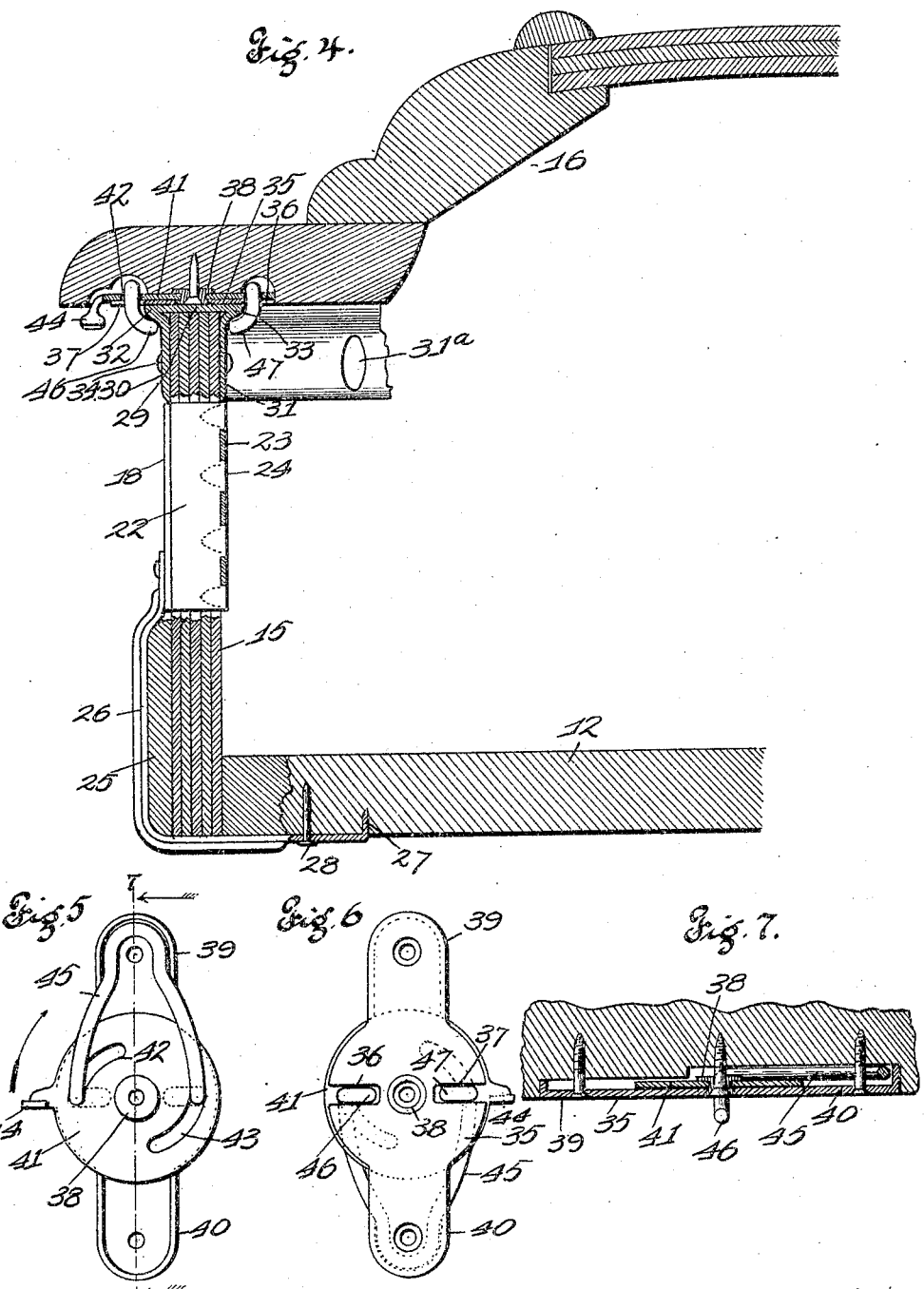

UNITED STATES PATENT OFFICE.

CHAUNCEY D. CRANDAL, OF ST. LOUIS, MISSOURI, ASSIGNOR OF ONE-HALF TO WILLIAM M. MURRAY, OF ST. LOUIS, MISSOURI.

COFFIN OR CASKET.

SPECIFICATION forming part of Letters Patent No. 789,007, dated May 2, 1905.

Application filed July 1, 1904. Serial No. 214,862.

*To all whom it may concern:*

Be it known that I, CHAUNCEY D. CRANDAL, a citizen of the United States, residing at St. Louis, State of Missouri, have invented certain new and useful Improvements in Coffins or Caskets, of which the following is a specification containing a full, clear, and exact description, reference being had to the accompanying drawings, forming a part hereof.

My invention relates to improvements in coffins and caskets; and it consists of the novel features herein shown, described, and claimed.

In the drawings, Figure 1 is a view in elevation of a coffin embodying the principles of my invention. Fig. 2 is a top plan view of the coffin shown in Fig. 1. Fig. 3 is a perspective of the hinged panel-support. Fig. 4 is an enlarged cross-section substantially on the line 4 4 of Fig. 1, showing the details of construction, parts being broken away to economize space. Fig. 5 is a top plan view of the top-fastener. Fig. 6 is a bottom plan view of the top-fastener. Fig. 7 is a sectional detail of the top-fastener and top, taken substantially on the line 7 7 of Fig 5, parts of the top being broken away.

In the drawings I have shown a coffin; but it is obvious that the same principles may be applied to a casket.

Referring to the drawings in detail, the coffin comprises the bottom 12, the end walls 13 and 14, the side wall 15, the rigid panel-top 16, and the hinged panel-top 17. The bottom 12 may be a solid board cut to the proper outlines, and the end and side wall may be made of three-cross-ply veneer or five-cross-ply veneer or with the combination of two outer veneers secured to suitable cross-strips, all glued together and made into the proper shape. In the details in Fig. 4 I have shown five-cross-ply veneer for the walls 13, 14, and 15. The ends 13 and 14 are bent and formed into the desired shapes, and the sides 15 are likewise bent to the desired shapes. The meeting edges of the walls are trimmed so that they will fit together, and the suitable fastenings are applied to connect the edges of the walls. The fasteners are considerably shorter than the width of the walls. A binding-strip 25 is placed against the outer faces of the walls, extending upwardly a short distance from the lower edges of the walls and entirely encircling the coffin, and the fasteners extend upwardly from the binding-strip 25. Corner-pieces 26 are placed in position in line with the fasteners, the upper ends of said corner-pieces being attached to the lower ends of the fasteners and said corner-pieces extending downwardly around the binding-strip 25 under the edges of the walls and under the bottom 12, said corner-pieces being secured to the bottom 12 by integral teeth 27, driven into the bottom, and by nails 28, inserted through the corner-pieces into the bottom, said corner-pieces serving to cover the joints to ornament the base of the coffin formed by the binding-strip 25 and to connect the walls securely to the bottom.

The upper edges of the walls 13, 14, and 15 are covered by a binder comprising the central portion 29, resting horizontally upon the upper edges of the walls, and the attaching portions 30 and 31 extending downwardly from the central portion upon the inner and outer sides of the walls. The binder is formed of sheet metal, and the metal is bent backwardly upon itself at the junction of the attaching-pieces to the central portion to form the flanges 32 and 33, and the binder is pressed or shaped to fit the upper edges of the walls and form a continuous finished metallic surface. Rivets 34 are inserted suitable distances apart to hold the binder in position.

The top 16 is secured rigidly and removably to the walls of the body by fasteners, the details of which are shown in Figs. 4, 5, 6, and 7. Each fastener comprises a cam-plate 35, having cam-slots 36 and 37 in a line crosswise of its center and having a pivoted eyelet 38 at its center; the attaching-plates 39 and 40, formed integral with the cam-plate 35; the eccentric plate 41, pivotally mounted upon the eyelet 38 and having the eccentric slots 42 and 43 operating crosswise of the cam-slots 36 and 37; the handle 44 for operating the eccentric plate 41; the spring-frame 45, mounted on the top of the attaching-plate 39, and the clamping-teeth 46 and 47 extending from the ends of the spring-frame 45 downwardly through the eccentric slots 42 and 43 and through the cam-slots 36 and 37 to engage under the flanges 32 and 33, so that when the handle 44 is operated in the direction indicated by the arrow in Fig. 5 the teeth 46 and 47 will be spread apart to release the top 16 from the body and when the handle 44 is operated in the other direction the teeth 46 and 47 will be forced together to grip the flanges 32 and 33 and hold the top securely in position.

The rigid panel-top 16 is securely mounted upon the body-coffin, and the hinged panel-top 17 is connected to the rigid panel-top by detachable lock-hinges. Each detachable lock-hinge comprises two members.

The top 17 will swing back upon the top 16, and in order to prevent the two tops from knocking together I use a hinged panel-support comprising the attaching-plate 59, having screw-openings 60, through which screws are inserted to attach the plate to the end of the top 17; the bearing-plates 61 extending upwardly from the attaching-plate 59; the housing-plate 62, connecting the bearing-plates 61, said housing-plate being as high as the bearing-plates; the housing-plate 63, connecting the bases of the bearing-plates 61, thus forming the socket 64; the pivoted post 65, having a slotted bearing 66, (shown in dotted lines;) the pivot 67 inserted through the bearing-plates 61 and through the slotted bearing 66; the head 68 upon the free end of the pivoted post, and the rubber cushion 69, carried by the head. The end of the pivoted post 65 will slide downwardly into the socket 64, and then the housing-plates will hold the post in a vertical position, and the post is long enough so that the cushion 69 extends above the top of the panel 17, and when the panel is swung backwardly upon the top 16 the cushion 69 will engage the top 16 and prevent marring and noise. When the top 17 is swung to its closed position, the post 65 may be raised upwardly in the socket 64 to the extent of the slotted bearing 66, and then the post may turn downwardly upon the housing-plate 63.

Openings 31$^a$ are formed in the attaching portions 31 of the binder, so that when it is desired to place a lining in the cover the tacks to secure the lining may be inserted through said openings.

In a companion application, filed January 9, 1905, for interlocking fasteners, Serial No. 240,308, I have shown, described, and claimed the interlocking fastener generally, and I do not wish to make such claims in this application.

I claim—

1. In coffins and caskets: a solid bottom; walls extending upwardly from the bottom and having veneered inner and outer surfaces; interlocked fastenings connecting the meeting edges of the walls; and a binder covering the upper edges of the walls; substantially as specified.

2. In coffins and caskets: a suitable bottom; walls extending upwardly from the bottom; interlocked fastenings connecting the meeting edges of the walls; each of said fastenings comprising: a sheet-metal plate having the central portion 18; the returned portions 19 and 20 bent backwardly upon the central portion; the spacing portions 21 and 22 extending inwardly side by side from the inner edges of the portions 19 and 20; and the interlocked teeth 23 and 24 extending from the inner edges of the portions 21 and 22; said teeth crossing over the portions 21 and 22, so as to lock said portions together; substantially as specified.

3. In coffins and caskets: a suitable bottom; walls extending upwardly from the bottom; and interlocked fastenings connecting the meeting edges of the walls, each of said interlocked fastenings comprising: a sheet-metal plate bent to form a central portion adapted to cover the joint; returned portions extending inwardly from the edges of the central portion; spacing portions extending backwardly from the inner edges of the returned portions; teeth extending from the rear edges of the spacing portions; and said teeth crossing over so as to lock the spacing portions together; substantially as specified.

4. In coffins and caskets: a suitable bottom; walls extending upwardly from the bottom; interlocked fasteners connecting the meeting edges of the walls; and a binder covering the upper edges of the walls; said binder comprising the central portion 29 resting horizontally upon the upper edges of the walls; and the attaching portions 30 and 31 extending downwardly from the central portion upon the inner and outer sides of the walls; substantially as specified.

5. In coffins and caskets: a suitable bottom; veneered walls extending upwardly from the bottom; interlocked fasteners connecting the meeting edges of the veneered walls; and a binder covering the upper edges of the veneered walls and connecting said walls together, said binder comprising a central portion resting horizontally upon the upper edges of the veneered walls; and attaching portions extending downwardly from the edges of the central portion upon the inner and outer faces of the veneered walls; substantially as specified.

6. In coffins and caskets: a suitable body: a top for covering the body; and fasteners for removably connecting the top to the body; each of said fasteners comprising: a cam-plate having cam-slots in a line crosswise of its center; attaching-plates extending from the cam-plate; an eccentric plate pivotally mounted upon the cam-plate and having eccentric slots operating crosswise of the cam-slots; a spring-frame mounted upon one of the attaching-plates; and clamping-teeth extending from the spring-frame through the eccentric slots and through the cam-slots, so that by rotating the cam-plate, the clamping-teeth may be opened or closed; said attaching-plates being secured to the top; and means carried by the body to be engaged by the clamping-teeth; substantially as specified.

7. In coffins and caskets: a suitable bottom; walls extending upwardly from the bottom; a binder covering the upper edges of said walls and connecting the walls together; said binder comprising a central portion resting horizontally upon the upper edges of the walls; and attaching portions extending downwardly from the central portion upon the inner and outer sides of the walls; flanges extending outwardly at the junction of the attaching-plates with the central portion; a top for covering the body; and fasteners for connecting the top removably to the body; each of said fasteners comprising: a cam-plate secured to the top; an eccentric plate pivotally mounted upon the cam-plate and having eccentric slots; a handle for operating the eccentric plate; and means of providing clamping-teeth extending downwardly through the eccentric slots to engage said flanges, so that by moving the eccentric plate one way, the teeth will be opened, and by moving the eccentric plate the other way, the clamping-teeth will be closed to grip said flanges and hold the top in position; substantially as specified.

8. In coffins and caskets: a suitable rigid top; a hinged top connected to the rigid top and adapted to swing over upon the rigid top; and a support to prevent the two tops from knocking together; said support comprising, an attaching-plate; a socket extending upwardly from the attaching-plate; a post pivotally mounted in said socket; the pivoted bearing of the post being slotted; and a cushion carried by the upper end of said post; substantially as specified.

In testimony whereof I have signed my name to this specification in presence of two subscribing witnesses.

CHAUNCEY D. CRANDAL.

Witnesses:
 ALFRED A. EICKS,
 M. M. BRAZILL.